US012784449B2

(12) United States Patent
Varner et al.

(10) Patent No.: US 12,784,449 B2
(45) Date of Patent: Nov. 3, 2026

(54) VIDEO REDACTION USING AI-BASED OBJECT DETECTION AND MOTION-BASED DETECTION

(71) Applicant: MOTOROLA SOLUTIONS, INC., Chicago, IL (US)

(72) Inventors: William W. Varner, Somerville, MA (US); Paul Gassoway, Norwood, MA (US); Beau Horenberger, Woburn, MA (US); Fan Hu, Sharon, MA (US); Keshav T. Seshadri, Medford, MA (US); Peter L Venetianer, McLean, VA (US); Jonathan White, Charlestown, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 321 days.

(21) Appl. No.: 18/621,896

(22) Filed: Mar. 29, 2024

(65) Prior Publication Data

US 2025/0308234 A1 Oct. 2, 2025

(51) Int. Cl.
*G06K 9/00* (2022.01)
*G06V 10/764* (2022.01)
(Continued)

(52) U.S. Cl.
CPC ............ *G06V 20/41* (2022.01); *G06V 10/764* (2022.01); *G06V 10/776* (2022.01); *G06V 20/49* (2022.01)

(58) Field of Classification Search
CPC .... G06V 10/764; G06V 10/776; G06V 20/46; G06V 20/49; G06V 20/52; G06V 20/41; G06V 10/82
See application file for complete search history.

(56) References Cited

U.S. PATENT DOCUMENTS 7,391,907 B1 * 6/2008 Venetianer ............ G06V 20/52 382/168
7,583,815 B2 * 9/2009 Zhang ................. G08B 29/188 348/169
(Continued)

OTHER PUBLICATIONS

International Search Report and Written Opinion for Application No. PCT/US2025/017578 dated Apr. 14, 2025 (15 pages).
(Continued)

*Primary Examiner* — Avinash Yentrapati
(74) *Attorney, Agent, or Firm* — Michael Best & Friedrich LLP

(57) ABSTRACT

Examples provide a system for performing video redaction. The system includes an electronic processor configured to obtain video data, identify an object in a respective frame of video data using an artificial intelligence (AI) model trained on object detection, and flag the object for redaction from the video data. The electronic processor is also configured to identify a moving portion in the respective frame of the video data. The moving portion including at least one pixel having motion in a plurality of frames of the video data. The moving portion is included in a portion of the video data not having the object flagged for redaction. The electronic processor performs a motion analysis of the moving portion of the video data, and, based on a result of the motion analysis, flags the moving portion for redaction from the video data.

28 Claims, 4 Drawing Sheets

(51) Int. Cl.
*G06V 10/776* (2022.01)
*G06V 20/40* (2022.01)

(56) References Cited

U.S. PATENT DOCUMENTS

| | | | | |
|---|---|---|---|---|
| 10,347,293 | B1 * | 7/2019 | Skinner | G06F 3/1462 |
| 10,643,667 | B2 * | 5/2020 | Chau | G06V 20/52 |
| 11,082,731 | B1 * | 8/2021 | Cox | H04N 21/234318 |
| 11,170,267 | B1 * | 11/2021 | Lee | G06F 18/217 |
| 11,527,265 | B2 * | 12/2022 | Peleg | G06F 16/7837 |
| 11,769,233 | B1 * | 9/2023 | Poulin | G06F 21/6245 386/278 |
| 12,413,809 | B2 * | 9/2025 | Matusek | H04N 21/23418 |
| 2013/0058523 | A1 * | 3/2013 | Wu | G06V 20/54 382/103 |
| 2018/0268240 | A1 * | 9/2018 | Loce | G06F 16/71 |
| 2020/0097769 | A1 * | 3/2020 | Lipchin | G06V 40/167 |
| 2020/0320665 | A1 * | 10/2020 | Eswara | G06T 11/40 |
| 2021/0297629 | A1 * | 9/2021 | Lemes da Silva | G06N 3/04 |
| 2023/0108667 | A1 * | 4/2023 | Hassbring | G06V 20/52 348/143 |
| 2023/0237810 | A1 * | 7/2023 | Roedler | G06V 10/774 382/103 |
| 2024/0087282 | A1 * | 3/2024 | Young | G06T 5/77 |
| 2024/0205356 | A1 * | 6/2024 | Tan | G06V 10/25 |
| 2025/0046343 | A1 * | 2/2025 | Kolavennu | G11B 27/031 |

OTHER PUBLICATIONS

Zhou et al., "Personal Privacy Protection via Irrelevant Faces Tracking and Pixelation in Video Live Streaming," IEEE Transactions on Information Forensics and Security, 2021, vol. 16, pp. 1088-1103.

Zhou et al., "Privacy-sensitive Objects Pizelation for Live Video Streaming," Proceedings of the 28th ACM International Conference on Media, 2020 (9 pages).

Eibrand, "Upgraded AXIS Live Privacy Shield now free and easier to use indoors and outdoors," <https://newsroom.axis.com/en-ca/news/upgraded-live-privacy-shield> article dated Jun. 3, 2021 (3 pages).

* cited by examiner

VIDEO REDACTION USING AI-BASED OBJECT DETECTION AND MOTION-BASED DETECTION

BACKGROUND

Video redaction is the removal, blurring, replacement, or otherwise concealment of selected portions of video data.

Figure 1:
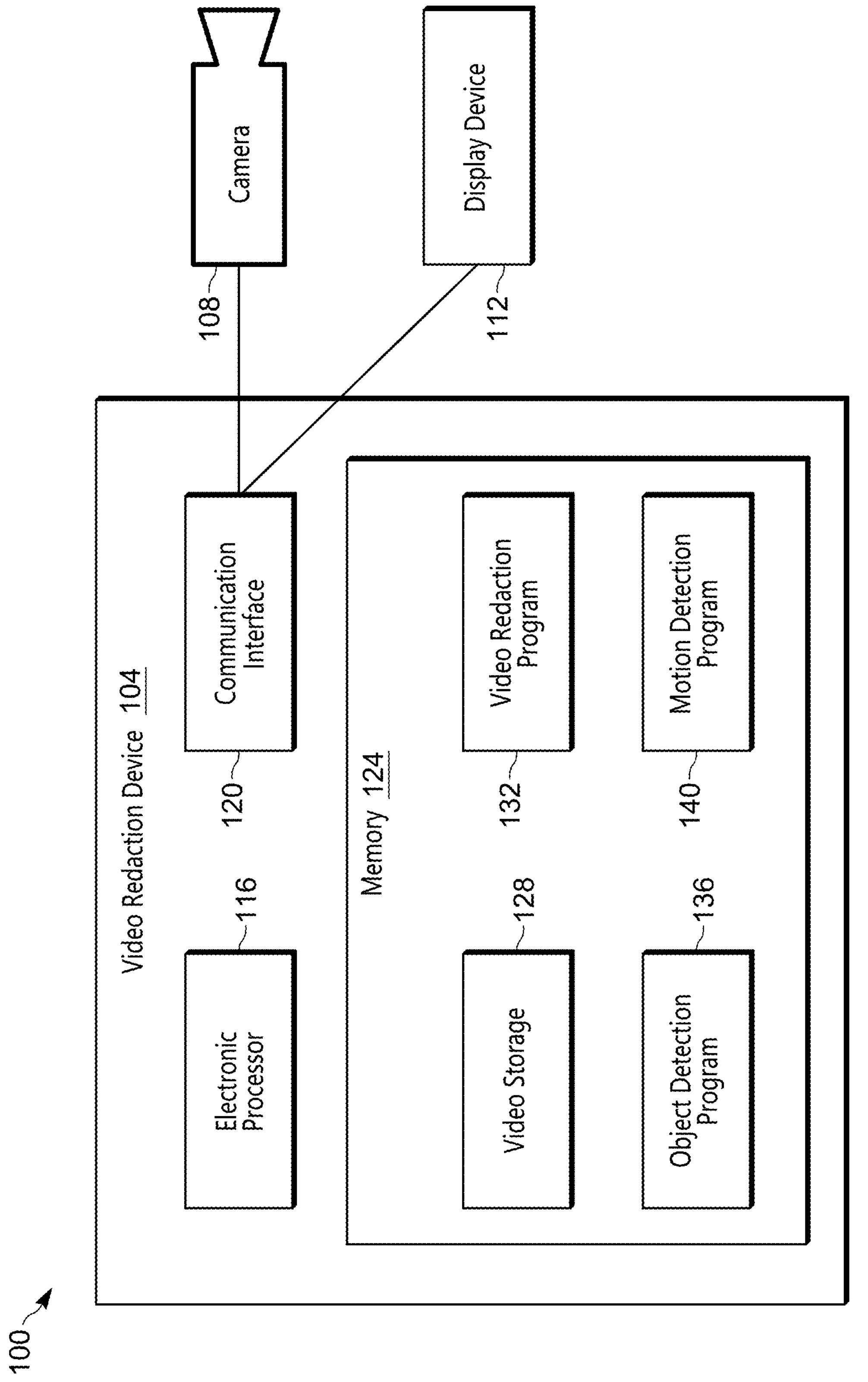
FIG. 1 schematically illustrates a video redaction system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Object detection programs may be used in video reaction systems to detect target object types (e.g., humans, faces, license plates, private property, and/or other targets that may be subject to privacy concerns.) that are intended to be redacted from video data. These object detection programs typically rely on trained artificial intelligence (AI) models, such as convolutional neural network (CNN) models. However, when confidence in a detection is low, private information may not be adequately redacted from the video data. For example, object detection programs often require multiple consecutive frames of video data to detect an object in those frames. When that video is being streamed live, there is a risk that missed redactions (i.e., missed object detections of a target object type) are displayed to a viewer of the video stream. Additionally, in cases where video data is reviewed manually by a human reviewer, there is a risk of human error resulting in missed redactions in video data that is then exported and shared.

As an alternative to object detection for video redaction, motion-based detection programs identify moving portions (e.g., clusters of moving pixels) in video data, which often correspond to humans and vehicles, and flag those detected moving portions for redaction. However, motion-based video redaction may result in missed redactions of non-moving targets. In some scenarios, motion-based video redaction may be over-aggressive in redaction. For example, plants moving in wind, leaves, or other debris may be detected and redacted from the video data. When the video data is captured at night, light shining from vehicle headlights may be flagged as a moving object. Similarly, changes in ambient lighting (e.g., clouds moving in front of the sun) may result in portions of video data being flagged as moving objects. When the video is captured during rain or snow, the clusters of precipitation may be flagged as moving objects. These over-aggressive redactions may obscure important information from the video data. In some instances, such as during rain or snow, over-aggressive redactions can obscure nearly an entirety of each video frame.

Thus, there is a need for an improved video redaction system that detects potential missed redactions while mitigating over-aggressive redactions. One example provides a system for performing video redaction. The system includes an electronic processor configured to: obtain video data, identify an object in a respective frame of video data using an artificial intelligence (AI) model trained on object detection, flag the object for redaction from the video data, identify a moving portion in the respective frame of the video data, the moving portion including at least one pixel having motion in a plurality of frames of the video data, wherein the moving portion is included in a portion of the video data not having the object flagged for redaction, perform a motion analysis of the moving portion of the video data, and based on a result of the motion analysis, flag the moving portion for redaction from the video data.

In some aspects, the motion analysis includes determining whether an area of the moving portion in the respective frame of the video data is less than a threshold area, and the electronic processor is configured to, in response to determining that the area of the moving portion in the respective frame of the video data is less than a threshold area, flag the moving portion for redaction from the video data.

In some aspects, the electronic processor is further configured to: in response to determining that the area of the moving portion in the respective frame of the video data is not less than a threshold area, flag an edge portion of the respective frame for redaction from the video data.

In some aspects, the electronic processor is further configured to determine the threshold area by dynamically selecting a threshold area ratio that is a ratio of the threshold area to a total area of the respective frame based on at least one selected from the group consisting of: an area of moving portions included in identified objects exceeding a threshold, and a total number of identified objects in the respective frame exceeding a threshold number of objects.

In some aspects, the motion analysis includes determining whether the moving portion in the respective frame of the video data has a consistency with a corresponding moving portion in a previous frame of the video data, and the electronic processor is configured to, in response to determining that the moving portion in the respective frame of the video data has a consistency with a corresponding moving portion in a previous frame of the video data, flag the moving portion for redaction from the video data.

In some aspects, the consistency includes a consistency in area size of the moving portion.

In some aspects, the consistency is determined using pixel-differencing with respect to the moving portion in the respective frame of the video data and a previous frame of the video data.

In some aspects, the consistency includes a consistency in trajectory of the moving portion.

In some aspects the motion analysis includes determining a compactness of the moving portion in the respective frame of the video data, and the electronic processor is configured to flag the moving portion for redaction from the video data based on the compactness.

In some aspects, the identifying of an object in a respective frame of video data includes determining a confidence level associated with a detection of the object, and the electronic processor is configured to flag the object for redaction from the video data in response to the confidence level exceeding a threshold confidence level.

In some aspects, the threshold confidence level is a first threshold confidence level that is less than a second confidence level used for an object detection in video analysis processes other than video redaction.

In some aspects, the electronic processor is configured to determine whether the object is a tracked object having been detected in a previous frame of video data, and flag the object for redaction from the video data in response to determining that the object is a tracked object.

In some aspects, the electronic processor is configured to flag an edge portion of the respective frame for redaction from the video data.

In some aspects, the electronic processor is communicatively connected to a display device, and the electronic processor is further configured to: provide a redacted video stream of the video data to a graphical user interface (GUI) of the display device, and responsive to verifying a user permission associated with a user of the display device, provide an at least partially unredacted video stream of the video data to the GUI.

In some aspects, the object detection is performed with respect to a set of target object types.

In some aspects, the moving portion includes at least one pixel.

In some aspects, the system further includes a video camera configured to obtain the video data.

Another examples provides a method for performing video redaction. The method includes: obtaining video data; identifying an object in a respective frame of video data using an artificial intelligence (AI) model trained on object detection; flagging the object for redaction from the video data; identifying a moving portion in the respective frame of the video data, the moving portion including at least one pixel having motion in a plurality of frames of the video data, wherein the moving portion is included in a portion of the video data not having the object flagged for redaction; performing a motion analysis of the moving portion of the video data; and based on a result of the motion analysis, flagging the moving portion for redaction from the video data.

In some aspects, the motion analysis includes determining whether an area of the moving portion in the respective frame of the video data is less than a threshold area, and the method further includes, in response to determining that the area of the moving portion in the respective frame of the video data is less than a threshold area, flagging the moving portion for redaction from the video data.

In some aspects, the method further include, in response to determining that the area of the moving portion in the respective frame of the video data is not less than a threshold area, flagging an edge portion of the respective frame for redaction from the video data.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 schematically illustrates an example video redaction system 100. The video redaction system 100 includes a video redaction device 104, a video camera 108, and a display device 112. The camera 108 is configured to capture video data and provide the video data to the video redaction device for analysis and redaction. The display device 112 is configured to receive processed video data from the video redaction device and display the processed video data to a user of the display device 112.

In the example shown, the video redaction device 104 includes an electronic processor 116 (i.e., at least one electronic processor 116), a communication interface 120 (i.e., at least one communication interface 120), and a memory 124 (i.e., at least one memory 124). The video redaction device 104 is communicatively connected to the camera 108 and the display device 112 by means of the communication interface 120. For example, the communication interface 120 may receive video data captured by the camera 108 (and stored, for example, in the memory 124), and transmit processed video data (e.g., redacted video data) to the display device 112.

In the example shown, the memory 124 includes, among other things, video storage 128 for storing video data received from the camera 108, and a video redaction program 132 for analyzing and performing redactions on the video data received from the camera 108. The memory 124 also stores an object detection program 136 and a motion detection program 140 that are used in conjunction with the video redaction program 132 for performing the methods described herein. The object detection program is, for example, an AI-based object detection program 136. Some or all components of the system 100 (e.g., the video storage 128, the video redaction program 132, the object detection program 136, the motion detection program 140, etc.) and the corresponding methods described herein may be part of the operation of a video management system (VMS). The VMS may control, for example based on user inputs, the streaming of video data to display devices, permissions associated with redacted or unredacted video streams, exporting and sharing of redacted video streams, and/or other aspects of the functionality of the camera 108.

For simplicity, the video redaction device 104 is illustrated in FIG. 1 as a single device. However, the video redaction device 104 may be implemented in a distributed manner as multiple video redaction devices (e.g., as multiple edge devices, multiple cloud devices, or a combination thereof). In some instances, some or all functionality of the video redaction device 104 are implemented within the camera 108 and/or the display device. For example, the camera 108 may store the object detection program 136 and/or motion detection program 140, and transmit the results of object detection analysis and/or motion detection analysis to the video redaction device (e.g., via the communication interface 120). In some instances, the video storage 128 and/or video redaction program 132 are stored in the display device 112. Additionally, the video redaction device may be implemented using one or more servers communicatively connected to other components of the system, such as the camera 108 and the display device 110, by means of the communication interface 120. In some instances, video redaction (e.g., using the video redaction program 132) is performed on the camera 108. Alternatively or in addition, video redaction may be performed offline, for example using video data stored in the video storage 128.

In some instances, the camera 108 includes multiple cameras 108 communicatively connected to the video redaction device 104. Similarly, in some instances, the display device 112 includes multiple display devices 112 communicatively connected to the video redaction device.

Figure 2:
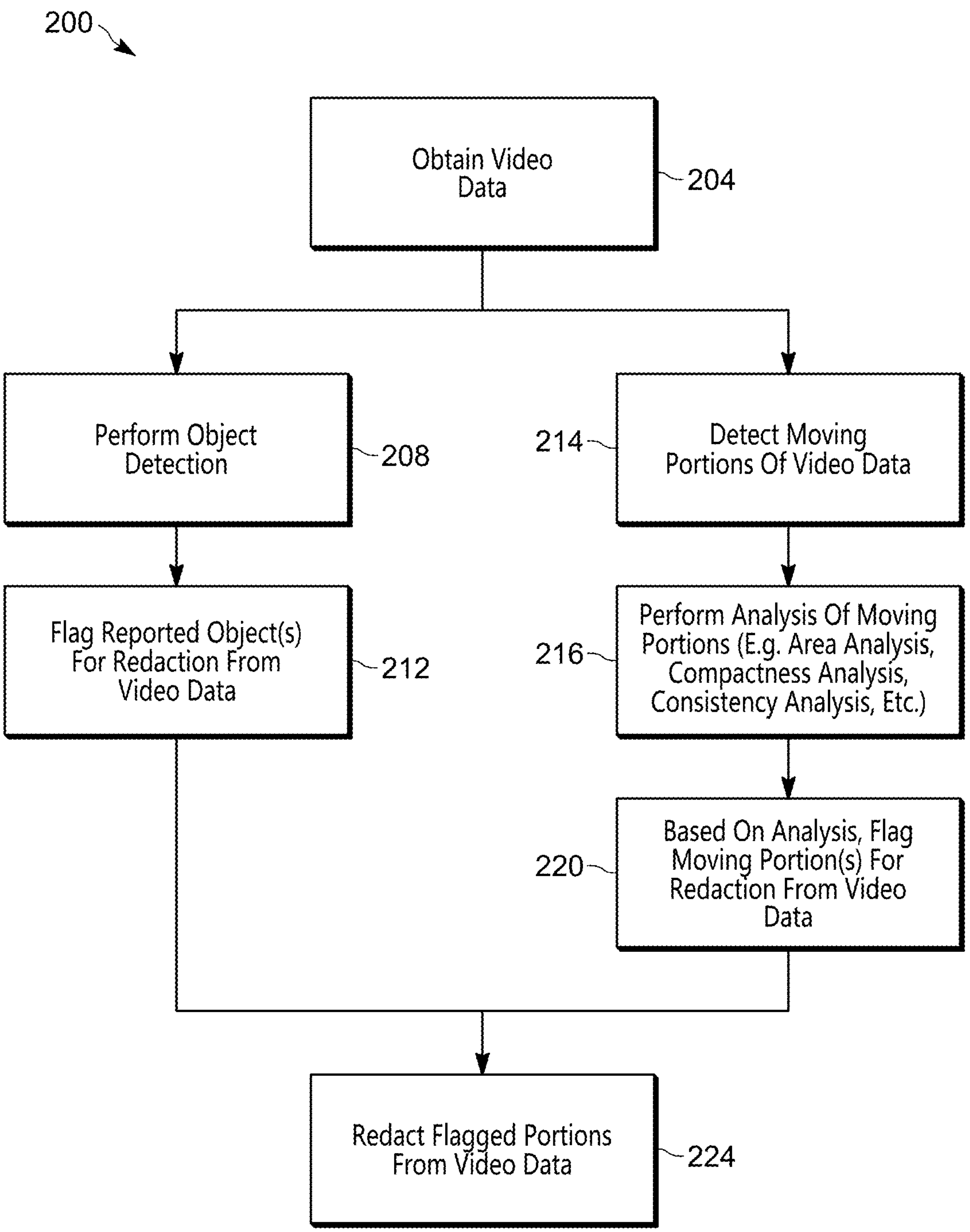
FIG. 2 illustrates a method for performing video redaction, according to some examples.

FIG. 2 illustrates an example method 200, performed by the electronic processor 116 in conjunction with other components of the system 100, for analyzing and redacting target information included in video data. The target information to be redacted may vary according to implementation. The target information to be redacted may be, for example, private information such as humans, human faces, license plates, private property, and/or the like.

The method 200 includes obtaining video data having a plurality of frames from the camera 108 (e.g., via the communication interface 120) (at block 204). The video data may be live video data or pre-recorded video data. For a respective frame of the video data, the electronic processor 116 performs object detection on the video data (e.g., using the object detection program 136) to identify an object (i.e., one or more objects) in the respective frame of the video data (at block 208), and flags detected objects of a target object type for redaction from the video data (at block 212). Redaction of flagged objects will be described in greater detail below with respect to block 224 of the method 200.

The object detection is performed with respect to a set of one or more target object types, such as humans, vehicles, license plates, or the like. For example, the object detection program 136 may use an AI model trained to detect a large variety of objects, but only objects of the target object type are flagged for redaction. The target object types may be user-defined or otherwise predetermined. In performing the object detection, the electronic processor 116 may determine a confidence level associated with the identification of potential objects, and report the object in response to the confidence level exceeding a threshold confidence level. As described above, when confidence in a detection is low (e.g., too low for a potential object to be reported), missed redactions may occur. Therefore, to reduce the risk of missed redactions, the threshold confidence level relied upon by the electronic processor 116 for reporting detected objects in the method 200 may be lower than a threshold confidence level used for object detection in video analysis methods other than video redaction. However, in some instances, one or more devices in the system 100 includes a second object detection program, different from the object detection program 136, that is used for video analysis methods other than video redaction. The second object detection program may run in parallel with the object detection program 136, and may be included in the camera 108, the video redaction device 104, the display device 112, or another device (e.g., another video analysis device, a server, etc.).

In some instances, the threshold confidence level varies according to the target object type. For example, redaction of humans may be higher priority than redaction of vehicles. In such examples, a confidence level threshold associated with detections of humans may be lower than a confidence level threshold associated with vehicles. In this manner, there is a reduced risk that a low-confidence detection of a high priority object (e.g., a human) results in a missed redaction that exposes private information. Similarly, there is also a reduced risk that a low-confidence detection of a low priority object (e.g., a vehicle) results in an over-aggressive redaction that obscures the video data.

In some instances, performing object detection also includes determining whether the detected object is a tracked object having been detected in a previous frame of the video data relative to the respective frame. Based on the type of tracked object, the electronic processor 116 may flag the object for redaction in response to determining that the object has been tracked for a threshold number of frames of video data. As described above, redaction of a first target object type (e.g., humans) may be higher priority than redaction of second target object type (e.g., vehicles). Accordingly, in some instances, the threshold number of frames may also vary according to target object type. For example, the electronic processor 116 may flag a detected human for redaction in response to tracking the human for only one frame. In contrast, the electronic processor 116 may flag a detected vehicle for redaction in response to tracking the vehicle for five frames.

As described above, video redaction based on object detection presents a risk of missed redactions. For example, as a target object (e.g., a human) enters the field of view of the camera 108, the human may not become identifiable using the object detection program 136 until a large enough portion of the human is in a respective frame of the video data. In other words, a portion of the human may remain unredacted in the video data until the human can be identified as such. Therefore, to identify missed redactions, the electronic processor 116 performs motion detection on the video data to identify a moving portion (i.e., one or more moving portions) in the respective frame of the video data (at block 214). A moving portion in the respective frame of video data may include a single pixel or a cluster of multiple pixels. In performing motion detection, the electronic processor 116 may exclude or discard portions of the respective frame of video data that include detected objects already flagged for redaction (e.g., flagged at block 212). The moving portions that are not excluded (i.e., not part of a detected object) may otherwise be referred to as unknown moving portions, while the excluded moving portions that are part of detected objects may otherwise be referred to as known moving portions.

The electronic processor 116 performs a motion analysis of the moving portion (at block 216), and, based on a result of the analysis, flags the moving portion for redaction from the video data (at block 220).

In some instances, as part of the motion analysis performed at block 216, the electronic processor 116 determines whether the moving portion in the respective frame of the video data has a consistency with a corresponding moving portion in a previous or subsequent frame of the video data. The consistency may include a consistency in area size of the respective moving portions (e.g., respective clusters of moving pixels). The clusters may be determined based on proximity of the moving pixels to one another (e.g., contiguous pixel clusters or near-contiguous pixel clusters). The consistency in area size may be determined using, for example, pixel-differencing with respect to the moving pixels in the respective frame of the video data and the previous or subsequent frame of the video data. In some instances, the consistency includes a consistency in the trajectory of the moving portion (e.g., estimated based on optical flow of the moving portion).

In some instances, the motion analysis performed at block 216 includes determining a compactness of the moving portion in the respective frame of video data (e.g., a compactness of pixels included in the moving portion), and the electronic processor 116 flags the moving portion for redaction from the video data based on the compactness. For example, moving portions that are compact may have a higher likelihood of representing a missed redaction than moving portions that are not compact.

In some instances, as part of the motion analysis performed at block 216, the electronic processor 116 determines an area of the moving portion (e.g., a total area of all detected unknown moving portions) in the respective frame relative to a total area of the frame. In response to the area of the moving portion being less than a threshold area, the electronic processor 116 flags the moving portion for redaction from the video data (at block 220). In contrast, in response to determining that the area of the moving portion is greater than or equal to the threshold area, the electronic processor 116 may not flag the moving portion for redaction.

When unknown moving portions occupy a small area of a respective frame, there is a higher likelihood that the motion is caused by an object that is a missed redaction. In contrast, when unknown moving portions occupy a large area of a respective frame, there is a higher likelihood that the motion is caused by rain, snow, hail, vehicle headlights, or other obstructions that should not be redacted. However, a frame of video data having an obstruction may still include an unidentified target object. For example, a person entering or leaving the frame of the video (e.g., from an edge of the frame, through a doorway, from behind an obstruction, etc.) may not be identified by the object detection program until the person is fully visible, and, as a result, may not be flagged for redaction for several frames. Therefore, in some examples, in response to determining that the area of the moving portion is greater than or equal to the threshold area, the electronic processor 116 flags only edge portions of the frame for redaction. An edge portion or edge region of the frame may include a predetermined region of the frame where an object is likely to enter the frame. For example, an edge region may include the leftmost and/or rightmost 10 columns of the frame, 15 columns of the frame, 20 columns of the frame, or the like. By fully redacting moving portions when the area of the moving portions is less than a threshold area and otherwise only partially redacting the moving portions, the electronic processor 116 simultaneously reduces a risk of both over-aggressive redaction and missed redaction.

In some instances, the electronic processor 116 flags regions of the frame for redaction based on historic trends of detected moving pixels in the video data. For example, the electronic processor 116 may identify a region of the frame where target objects (e.g., objects of a target object type detected by the object detection program 136) historically enter in the video data (e.g., a region in the frame corresponding to a doorway, an area near an obstruction, or other frame edge). The electronic processor 116 may store the identified region as an edge region, and flag all moving pixels in the edge region for redaction.

Figure 3:
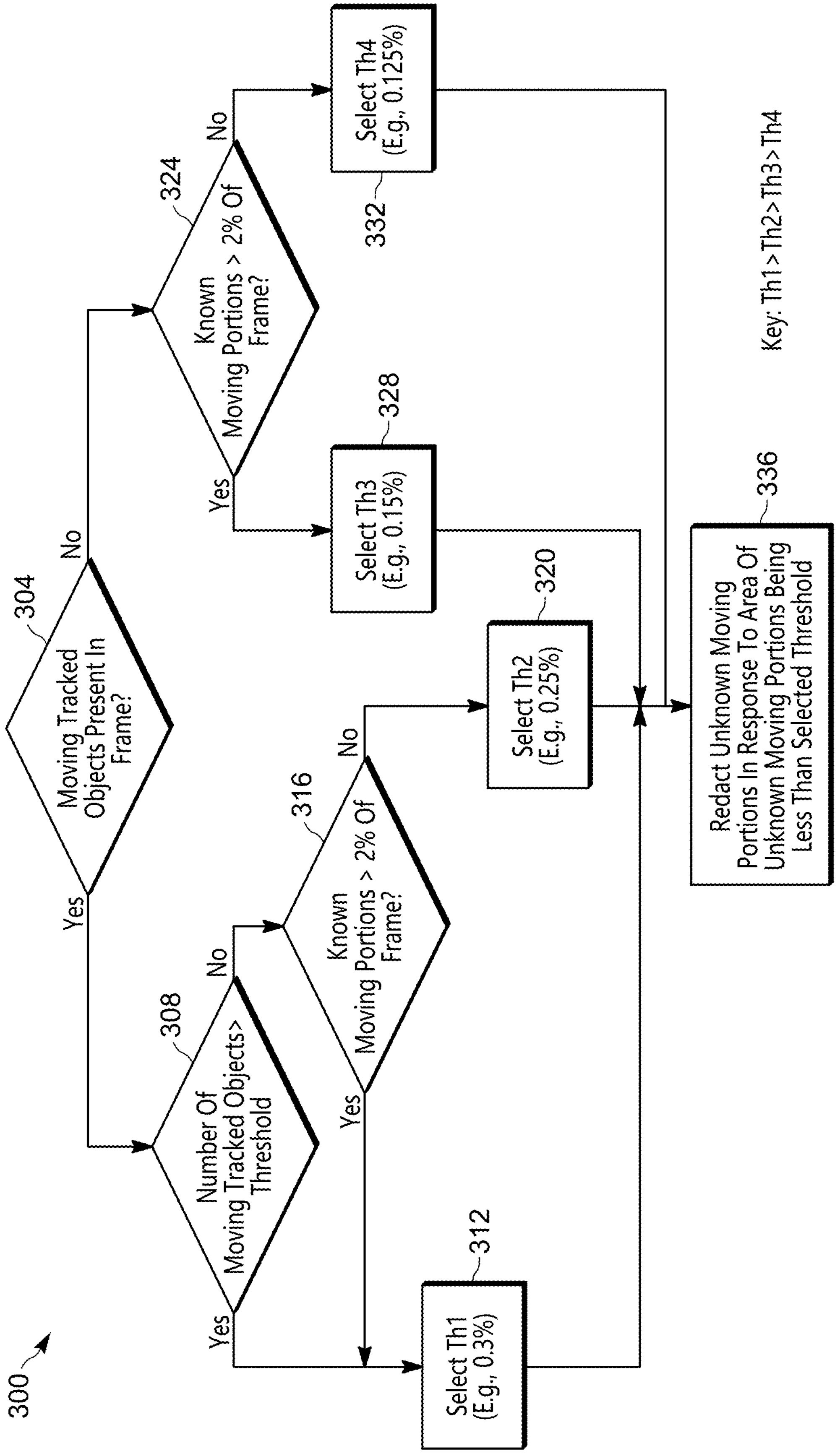
FIG. 3 illustrates a method for dynamically selecting a threshold associated with video redaction, according to some examples.

The threshold area relied upon by the electronic processor 116 for determining whether to flag moving portions may be a single predetermined area. However, in some instances, the motion analysis of block 216 also includes dynamically selecting the threshold area used for determining whether to flag moving portions for redaction. FIG. 3 illustrates an example method 300 performed by the electronic processor 116 for dynamically selecting the threshold area.

The method 300 includes determining, for a respective frame of the video data, whether the frame includes any moving tracked objects (e.g., moving objects of a target object type, such as humans or vehicles, that are tracked for a threshold number of frames) (at block 304). In response to determining that the respective frame includes at least one moving tracked object (YES at block 304), the electronic processor 116 determines whether the number of moving tracked objects exceeds a threshold number of moving tracked objects (at block 308). The threshold number of moving tracked objects may be two moving tracked objects, five moving tracked objects, ten moving tracked objects, or the like.

In response to determining that the number of moving tracked objects exceeds the threshold number moving tracked objects (YES at block 308), the electronic processor 116 selects the threshold area according to a first threshold area ratio Th1 (i.e., a ratio of the area of moving portions in the frame relative to the total area of the frame) (at block 312). When the respective frame of video data includes many moving tracked objects or when known moving portions otherwise occupy a large portion of the frame, there is higher likelihood that the unknown moving portions include undetected target objects (i.e., missed redactions) that should be flagged for redaction. Therefore, the first threshold area ratio Th1 may be larger than other selectable threshold area ratios. The first threshold area ratio Th1 may be, for example 0.3% of the frame. However, the value of the first threshold area ratio Th1 may vary according to implementation.

In response to determining that the number of moving tracked objects does not exceed the threshold number moving tracked objects (NO at block 308), the electronic processor 116 determines whether the area of known moving portions (i.e., the area of moving detected objects) exceeds a predetermined threshold area of the frame (e.g., an area corresponding to 1%, of the frame, an area corresponding to 2% of the frame, an area corresponding to 3% of the frame, etc.) (at block 316). In response to determining that the area of known moving portions exceeds the predetermined threshold area of the frame (YES at block 316), the electronic processor 116 selects the threshold area according to the first threshold area ratio Th1 (at block 312).

In response to determining that the number of moving detected objects does not exceed the threshold number of moving tracked objects (NO at block 308) and that the area of known moving portions does not exceed the predetermined threshold area of the frame (NO at block 316), the electronic processor 116 selects the threshold area according to a second threshold area ratio Th2 (at block 320). When the respective frame includes a small number of moving tracked objects (i.e., less than the threshold described at block 308) or when the area of known moving portions is less than a threshold, there is a moderate likelihood that the unknown moving portions include missed redactions and should be flagged for redaction from the video data. Therefore, the second threshold area ratio Th2 may be smaller than the first threshold area ratio Th1 but larger than other selectable threshold area ratios. For example, the second threshold area ratio Th2 may be 0.25% of the frame, though other values are contemplated.

In response to determining that the respective frame does not include at least one moving tracked object (NO at block 304), the electronic processor 116 determines whether the area of known moving portions exceeds a predetermined threshold area of the frame (e.g., an area corresponding to 1% of the frame, an area corresponding to 2% of the frame, an area corresponding to 3% of the frame, etc.) (at block 324). In response to determining that the area of known moving portions exceeds the predetermined threshold area of the frame (YES at block 324), the electronic processor 116 selects the threshold area according to a third threshold area ratio Th3 (at block 328). When the respective frame does not include any moving tracked objects, but the area of known moving portions is greater than a threshold, there is a moderate likelihood that the unknown moving portions include missed redactions and should be flagged for redaction from the video data. Therefore, the third threshold area ratio Th3 may be smaller than the first and second threshold area ratios Th1 and Th2 but larger than other selectable threshold area ratios. For example, the third threshold area ratio Th3 may be 0.15% of the frame, though other values are contemplated.

In response to determining that the respective frame does not include at least one moving tracked object (NO at block 304) and that the area of known moving portions does not exceed the predetermined threshold area of the frame (NO at block 324), the electronic processor selects the threshold area according to a fourth threshold area ratio Th4 as the threshold area (at block 332). When the respective frame does not include any moving tracked objects and area of known moving portions is less than a threshold, there is a low likelihood that the unknown moving portions include missed redactions. Therefore, the fourth threshold area ratio Th4 is smaller than the other selectable threshold area ratios Th1-Th3. For example, the fourth threshold area ratio Th4 may be 0.125% of the frame, though other values are contemplated.

In response to selecting the threshold area (e.g., at block 312, 320, 328, or 332), the electronic processor 116 determines the total area of the unknown moving portions relative to the area of the respective frame, and flags the unknown moving portions for redaction in response to the area of unknown moving portions relative to the area of the frame being less than the selected threshold (at block 336).

As described above, the values of threshold area ratios Th1-Th4 may vary according to implementation. Additionally, the relationship of respective threshold area ratios Th1-Th4 to one another may also vary according to implementation and user preferences. As an example, in some implementations, the first threshold area ratio Th1 may be smaller than one or more of the other threshold area ratios Th2-Th4.

Referring again to FIG. 2, in response to flagging detected objects for redaction form the video data (at block 212) and flagging the moving portions for redaction from the video data (at block 220), the electronic processor 116 redacts the flagged portions from the respective frame of the video data (at block 224). In some instances, the electronic processor 116 repeats some or all of the operations performed at blocks 208-220 with respect to subsequent frames of the video data before redacting flagged portions from the video data at block 224.

In some instances, object detection programs return a bounding box bounding each detected object (e.g., at block 208). In such instances, the electronic processor 116, using the video redaction program 132, may redact the flagged objects by, for example, redacting the portion of the video data bounded by each respective bounding box of the flagged detected objects. However, in some instances, the electronic processor 116 may redact only a portion of the video data bounded by a respective bounding box based on, for example, the target object type. For example, for human objects, the electronic processor 116 may generate one or more ellipses within the bounding box that better represents the shape of the detected human (e.g., a single ellipse representative of an entire human, a single ellipse representative of a human face, an ellipse with a circle on top representative of a human body and human head, etc.), and redact the portion of the video data bounded by the one or more ellipses. The electronic processor 116 may generate one or more other shapes different than ellipses, and redact the pixels in the generated shape.

In some instances, the electronic processor 116 identifies moving detected objects (e.g., using the object detection program 136 and motion detection program 140), and redacts only the moving pixels within a bounding box for a respective moving detected object. In some instances, the electronic processor 116 may redact only the moving pixels within a bounding box in response to determining that a threshold number, or threshold number ratio, of pixels within the bounding box are moving (e.g., 50% of the pixels in the bounding box are moving, 70% of the pixels in the bounding box are moving, 90% of the pixels in the bounding box are moving, etc.) In contrast, when fewer than the threshold number of pixels in the bounding box are moving, the electronic processor 116 does not redact only the moving pixels in the bounding box. Rather, the electronic processor 116 redacts all pixels in the bounding box, all pixels in one or more generated ellipses or other shape in the bounding box, or the like.

In some instances, the electronic processor 116 redacts an area of the frame corresponding to a hole in one or more clusters of detected moving pixels. For example, a moving vehicle having a large uniform surface may have portions thereof that are not detected as moving, while surrounding portions are detected as moving. Accordingly, in addition to redacting detected moving pixels, the electronic processor 116 may redact regions of the frame that are surrounded by detected moving pixels.

In some instances, rather than a bounding box, the object detection program 136 may return an object mask of a detected object shape (e.g., at block 208). In such instances, the electronic processor 116 may redact all pixels within the object mask.

The electronic processor 116 may provide the redacted video stream in near-realtime to the display device 112. In some instances, the electronic processor 116 stores both the unredacted video data and the redacted video data (e.g., in the video storage 128). In some instances, the electronic processor 116 stores an indication of the flagged portions of the video data and the corresponding unredacted video data, and redacts the video data according to the flagged portions in response to receiving a command to selectively provide redacted video data (for example, as part of the functionality of the VMS). For example, a first user of a device (e.g., the display device 112) may not have sufficient authorization to view private information that has been redacted from the video data. In contrast, a second user of the device, such as a supervisor, manager, or registered user of the VMS may have authorization to view private information that has been redacted from the video data.

Figure 4:
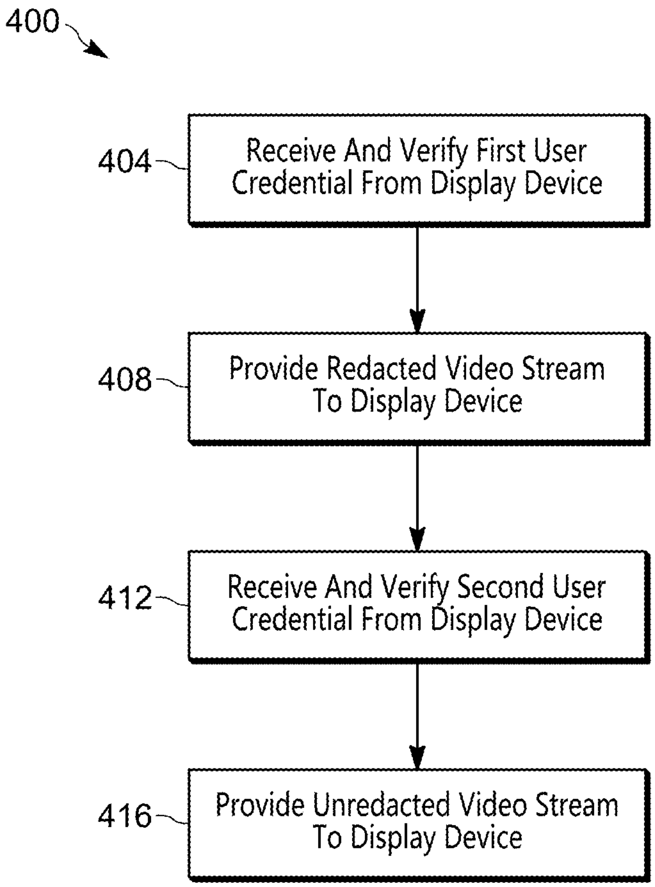
FIG. 4 illustrates a method for dynamically redacting a video stream based on user credentials.

FIG. 4 illustrates an example method 400 for selectively providing redacted video data to a display device (e.g., the display device 112) based on received user credentials. The method 400 includes receiving and verifying a first user credential, or user permission, associated with a first user of the display device 112 (at block 404). The first user credential may be received by the electronic processor 116 via a user input interface of the display device 112. The first user credential may indicate that the first user of the display device 112 does not have sufficient permission to view information that has been flagged for redaction from the video data. Therefore, in such instances, the electronic processor 116 provides a redacted video stream of the video data to a graphical user interface (GUI) of the display device 112 (at block 408).

In the example shown, the method 400 also includes receiving and verifying a second user credential associated with a second user of the display device 112 (at block 412). The second user credential may indicate that the second user of the display device 112 has sufficient permission to view some or all the information that has been flagged for redaction from the video data. For example, the second user credential may indicate that the second user may view redacted information related to vehicle license plates, but may not view redacted information related to human faces. Accordingly, in response to verifying the second user credential, the electronic processor 116 provides an at least partially unredacted video stream to the GUI of the display device 112 (at block 416).

In some instances, in response verifying the second user credential, the electronic processor 116 enables user selection of redacted portions of the video stream to be unredacted. For example, the user input interface of the display device 112 may receive, from the second user, a selection of a redacted region in the video stream. Responsive to receiving the selection, the electronic processor 116 provides a video stream of the video data having the selected region unredacted.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot redact video data, among other features and functions set forth herein).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for performing video redaction, the system comprising:

an electronic processor configured to:

obtain video data, identify an object in a respective frame of video data using an artificial intelligence (AI) model trained on object detection, flag the object for redaction from the video data, identify a moving portion in the respective frame of the video data, the moving portion including at least one pixel having motion in a plurality of frames of the video data, wherein the moving portion is included in a portion of the video data not having the object flagged for redaction, perform a motion analysis of the moving portion of the video data, and based on a result of the motion analysis, flag the moving portion for redaction from the video data, wherein the motion analysis includes determining whether an area of the moving portion in the respective frame of the video data is less than a threshold area, wherein the electronic processor is configured to, in response to determining that the area of the moving portion in the respective frame of the video data is less than a threshold area, flag the moving portion for redaction from the video data, wherein the electronic processor is further configured to, in response to determining that the area of the moving portion in the respective frame of the video data is not less than a threshold area, flag an edge portion of the respective frame for redaction from the video data.

2. The system of claim 1, wherein the electronic processor is further configured to determine the threshold area by dynamically selecting a threshold area ratio that is a ratio of the threshold area to a total area of the respective frame based on at least one selected from the group consisting of: an area of moving portions included in identified objects exceeding a threshold, and a total number of identified objects in the respective frame exceeding a threshold number of objects.

3. The system of claim 1, wherein the motion analysis includes determining whether the moving portion in the respective frame of the video data has a consistency with a corresponding moving portion in a previous frame of the video data, and the electronic processor is configured to, in response to determining that the moving portion in the respective frame of the video data has a consistency with a corresponding moving portion in a previous frame of the video data, flag the moving portion for redaction from the video data.

4. The system of claim 3, wherein the consistency includes a consistency in area size of the moving portion.

5. The system of claim 4, wherein the consistency is determined using pixel-differencing with respect to the moving portion in the respective frame of the video data and a previous frame of the video data.

6. The system of claim 4, wherein the consistency includes a consistency in trajectory of the moving portion.

7. The system of claim 1, wherein the motion analysis includes determining a compactness of the moving portion in the respective frame of the video data, and the electronic processor is configured to flag the moving portion for redaction from the video data based on the compactness.

8. The system of claim 1, wherein the identifying of an object in a respective frame of video data includes determining a confidence level associated with a detection of the object, and the electronic processor is configured to flag the object for redaction from the video data in response to the confidence level exceeding a threshold confidence level.

9. The system of claim 8, wherein the threshold confidence level is a first threshold confidence level that is less than a second confidence level used for an object detection in video analysis processes other than video redaction.

10. The system of claim 1, wherein the electronic processor is configured to determine whether the object is a tracked object having been detected in a previous frame of video data, and flag the object for redaction from the video data in response to determining that the object is a tracked object.

11. The system of claim 1, wherein the electronic processor is configured to flag an edge portion of the respective frame for redaction from the video data.

12. The system of claim 1, wherein the electronic processor is communicatively connected to a display device, and the electronic processor is further configured to:

provide a redacted video stream of the video data to a graphical user interface (GUI) of the display device, and responsive to verifying a user permission associated with a user of the display device, provide an at least partially unredacted video stream of the video data to the GUI.

13. The system of claim 1, wherein the object detection is performed with respect to a set of target object types.

14. The system of claim 1, wherein the moving portion includes at least one pixel.

15. The system of claim 1, further comprising a video camera configured to obtain the video data.

16. A method for performing video redaction, the method comprising:

obtaining video data;

identifying an object in a respective frame of video data using an artificial intelligence (AI) model trained on object detection;

flagging the object for redaction from the video data;

identifying a moving portion in the respective frame of the video data, the moving portion including at least one pixel having motion in a plurality of frames of the video data, wherein the moving portion is included in a portion of the video data not having the object flagged for redaction;

performing a motion analysis of the moving portion of the video data by determining whether an area of the moving portion in the respective frame of the video data is less than a threshold area;

in response to determining that the area of the moving portion in the respective frame of the video data is less than a threshold area, flagging the moving portion for redaction from the video data; and in response to determining that the area of the moving portion in the respective frame of the video data is not less than a threshold area, flagging an edge portion of the respective frame for redaction from the video data.

17. A method for performing video redaction, the method comprising:

obtaining video data;

identifying an object in a respective frame of video data using an artificial intelligence (AI) model trained on object detection;

flagging the object for redaction from the video data;

identifying a moving portion in the respective frame of the video data, the moving portion including at least one pixel having motion in a plurality of frames of the video data, wherein the moving portion is included in a portion of the video data not having the object flagged for redaction;

performing a motion analysis of the moving portion of the video data by determining whether an area of the moving portion in the respective frame of the video data is less than a threshold area;

determining a threshold area by dynamically selecting a threshold area ratio that is a ratio of the threshold area to a total area of the respective frame based on at least one selected from a group consisting of an area of moving portions included in identified objects exceeding a threshold, and a total number of identified objects in the respective frame exceeding a threshold number of objects; and in response to determining that the area of the moving portion in the respective frame of the video data is less than the threshold area, flagging the moving portion for redaction from the video data.

18. A system for performing video redaction, the system comprising:

an electronic processor configured to:

obtain video data, identify an object in a respective frame of video data using an artificial intelligence (AI) model trained on object detection, flag the object for redaction from the video data, identify a moving portion in the respective frame of the video data, the moving portion including at least one pixel having motion in a plurality of frames of the video data, wherein the moving portion is included in a portion of the video data not having the object flagged for redaction, perform a motion analysis of the moving portion of the video data, and based on a result of the motion analysis, flag the moving portion for redaction from the video data, wherein the motion analysis includes determining whether an area of the moving portion in the respective frame of the video data is less than a threshold area, wherein the electronic processor is configured to, in response to determining that the area of the moving portion in the respective frame of the video data is less than a threshold area, flag the moving portion for redaction from the video data, wherein the electronic processor is further configured to determine the threshold area by dynamically selecting a threshold area ratio that is a ratio of the threshold area to a total area of the respective frame based on at least one selected from the group consisting of: an area of moving portions included in identified objects exceeding a threshold, and a total number of identified objects in the respective frame exceeding a threshold number of objects.

19. The system of claim 18, wherein the electronic processor is further configured to:

in response to determining that the area of the moving portion in the respective frame of the video data is not less than a threshold area, flag an edge portion of the respective frame for redaction from the video data.

20. The system of claim 18, wherein the motion analysis includes determining whether the moving portion in the respective frame of the video data has a consistency with a corresponding moving portion in a previous frame of the video data, and the electronic processor is configured to, in response to determining that the moving portion in the respective frame of the video data has a consistency with a corresponding moving portion in a previous frame of the video data, flag the moving portion for redaction from the video data.

21. The system of claim 20, wherein the consistency includes a consistency in area size of the moving portion.

22. The system of claim 21, wherein the consistency is determined using pixel-differencing with respect to the moving portion in the respective frame of the video data and a previous frame of the video data.

23. The system of claim 21, wherein the consistency includes a consistency in trajectory of the moving portion.

24. The system of claim 18, wherein the motion analysis includes determining a compactness of the moving portion in the respective frame of the video data, and the electronic processor is configured to flag the moving portion for redaction from the video data based on the compactness.

25. The system of claim 18, wherein the identifying of an object in a respective frame of video data includes determining a confidence level associated with a detection of the object, and the electronic processor is configured to flag the object for redaction from the video data in response to the confidence level exceeding a threshold confidence level.

26. The system of claim 25, wherein the threshold confidence level is a first threshold confidence level that is less than a second confidence level used for an object detection in video analysis processes other than video redaction.

27. The system of claim 18, wherein the electronic processor is configured to determine whether the object is a tracked object having been detected in a previous frame of video data, and flag the object for redaction from the video data in response to determining that the object is a tracked object.

28. The system of claim 18, wherein the electronic processor is configured to flag an edge portion of the respective frame for redaction from the video data.

* * * * *